S. T. WILLIS.
MECHANISM FOR UTILIZING THE EXHAUST GASES OF INTERNAL COMBUSTION ENGINES.
APPLICATION FILED OCT. 19, 1906.

980,382.

Patented Jan. 3, 1911.

3 SHEETS—SHEET 1.

Witnesses.
C. H. Garnett
J. Murphy

Inventor.
Samuel T. Willis
by Jas. H. Churchill
Atty.

UNITED STATES PATENT OFFICE.

SAMUEL T. WILLIS, OF WORCESTER, MASSACHUSETTS.

MECHANISM FOR UTILIZING THE EXHAUST-GASES OF INTERNAL-COMBUSTION ENGINES.

980,382. Specification of Letters Patent. Patented Jan. 3, 1911.

Application filed October 19, 1906. Serial No. 339,610.

*To all whom it may concern:*

Be it known that I, SAMUEL T. WILLIS, a citizen of the United States, residing in Worcester, in the county of Worcester and State of Massachusetts, have invented an Improvement in Mechanism for Utilizing the Exhaust-Gases of Internal-Combustion Engines, of which the following description, in connection with the accompanying drawings, is a specification, like letters on the drawings representing like parts.

This invention has for its object the utilization of the exhaust gases of an internal combustion engine.

The invention is particularly applicable among other uses for driving automobiles, and in the present instance is herein shown as so applied. For this purpose I employ a pressure tank or vessel, which is connected with the exhaust pipe of the internal combustion engine and receives the exhaust gases from said engine, which are accumulated therein until a predetermined pressure has been obtained, which pressure is utilized in producing work, and in the case of the automobile is used for propelling the same. To this end, the automobile is provided with a turbine, impulse wheel or other similar motor, which is connected with the pressure tank or vessel, so as to be driven by the accumulated exhaust gases. Provision is made for cutting out or stopping the internal combustion engine, when the pressure in the tank or vessel reaches a predetermined point or amount, and for starting said engine when said pressure falls below a predetermined amount. Provision is also made for controlling the speed of the vehicle by a single device in the hands of the operator.
Provision may also be made for utilizing the engine as a brake for the vehicle as will be described.

These and other features of this invention will be pointed out in the claims at the end of this specification.

Figure 1:
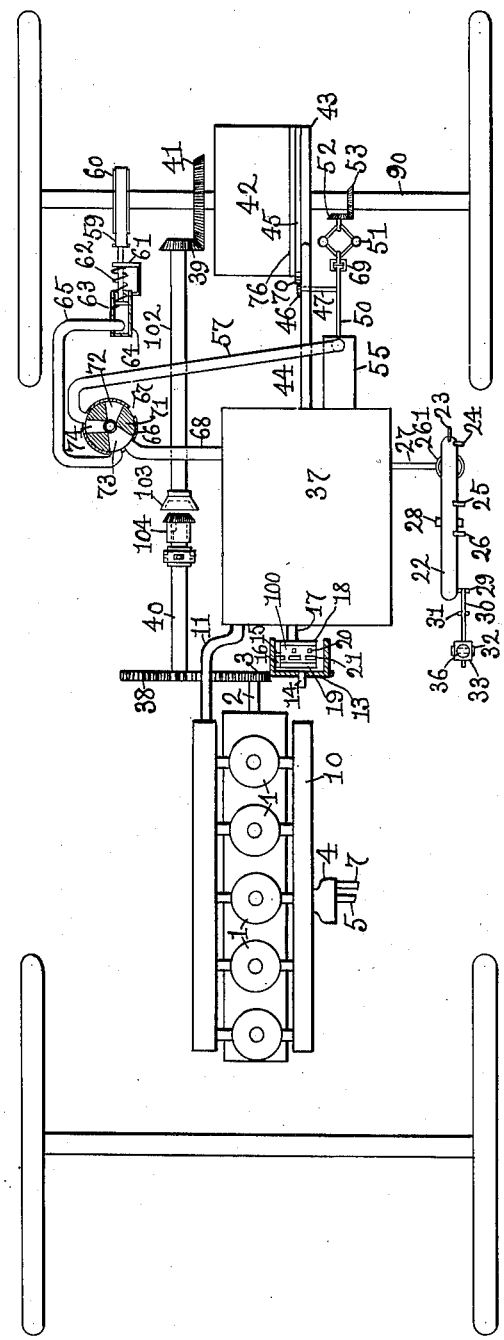
Figure 2:
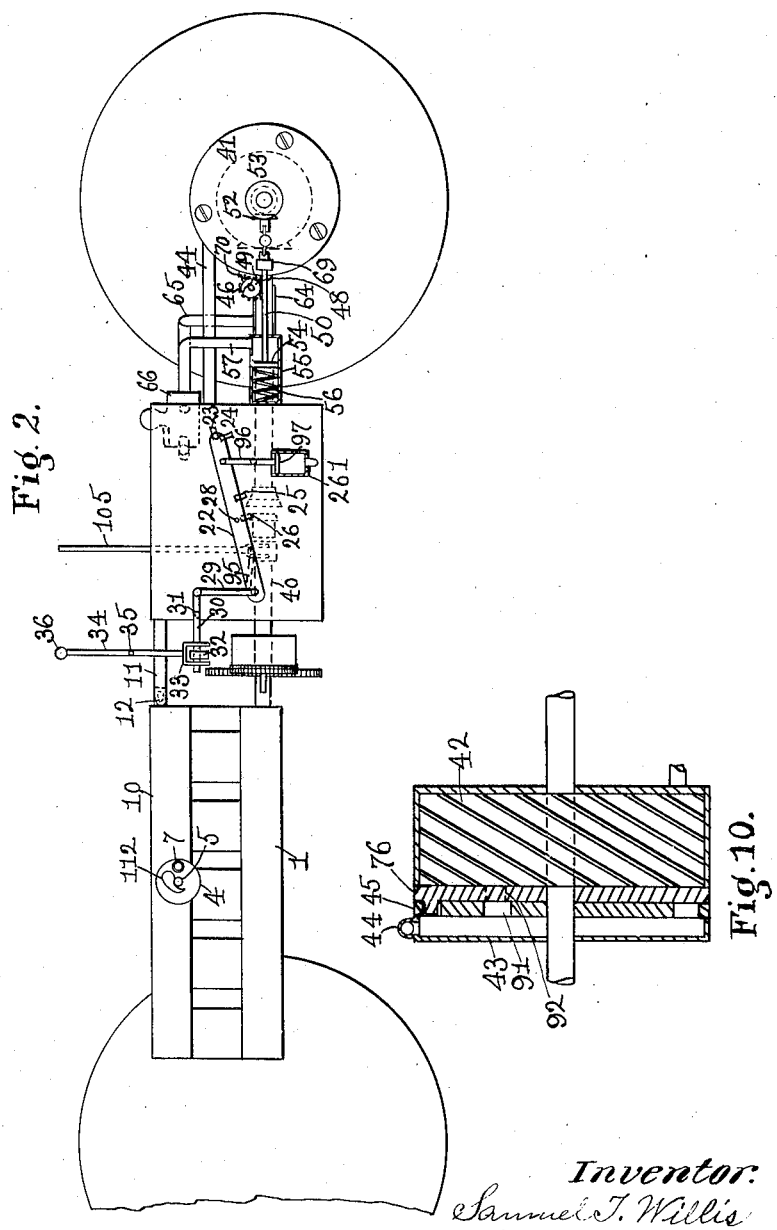
Figure 3:
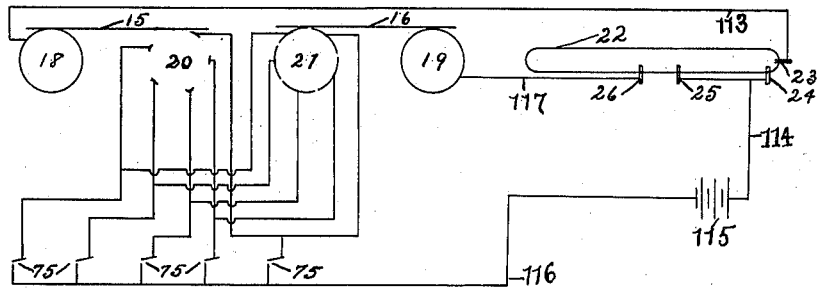
Figure 4:
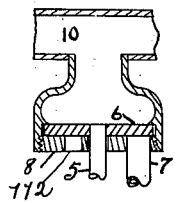
Figure 5:
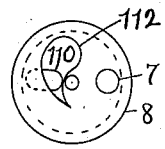
Figure 6:
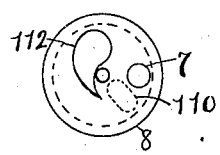
Figure 7:
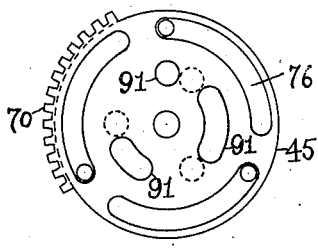
Figure 8:
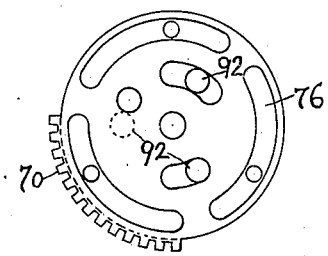
Figure 9:
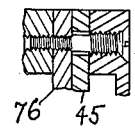

Figure 1 is a plan view of a sufficient portion of an automobile provided with a propelling mechanism embodying this invention, to enable the same to be understood. Fig. 2, a side elevation with parts in section of the vehicle shown in Fig. 1. Fig. 3, a diagram of circuits to be referred to. Figs. 4, 5 and 6, details of a valve to be referred to, Figs. 7, 8 and 9, details of the valve for the turbine to be referred to and Fig. 10, a sectional detail to be referred to.

Referring to the drawings, 1 represents an internal combustion engine of any suitable or usual construction, such for instance as now commonly employed for propelling automobiles. The gas engine 1 is represented as provided with five cylinders, each of which has the usual valves and sparking devices not shown and to each of which explosive mixture, such as gasolene and air, is supplied from a carbureter, the initial explosion in one of the cylinders being obtained in the usual manner by cranking the engine by hand as now commonly practiced.
In accordance with the present invention, the gas engine 1 has its exhaust pipe 11 connected with a closed tank or reservoir 37 into which the exhaust gases from the engine are forced or discharged, and wherein they are accumulated until a working pressure has been obtained, which is utilized in the present instance for propelling the automobile, which latter is conventionally represented and has mounted on its rear axle 90 a turbine engine, impulse wheel or other suitable motor 42, of any suitable or desired construction.

The pressure tank or vessel 37 in the present instance is represented as connected by pipe 44 with a chamber or casing 43 attached to or forming part of the turbine 42 and communicating therewith through suitable ports 91 in a disk valve 45, which coöperates with a face plate or disk 76 for the turbine, the disk 76 having suitable ports 92 with which the ports 91 are adapted to register to admit gas under pressure into the turbine 42 to effect rotation thereof and of the rear axle 90 and thus propel the automobile.

Provision is made for automatically stopping the engine 1 when the pressure in the tank 37 reaches a predetermined point or amount, and also for starting the same in operation when the pressure in said tank falls below the predetermined amount. In the present instance, one form of mechanism for accomplishing this result is shown, but it is not desired to limit the invention to the particular mechanism shown. To this end a circuit controlling device is provided which governs the circuit of the circuit closer for the sparking plugs of the engine 1. The circuit controlling device herein shown consists of a tube 22 which is hermetically sealed and contains a small amount of mercury indicated by the dotted lines 95. The tube 22, when made of glass, may be protected by an inclosing tube of metal, not shown. The tube 22 is mounted to turn on a suitable pivot or pivots 28, and is connected at one end by a link 29 with the short arm of the lever 30 pivoted as at 31 and carrying a weight 32, which is adjustable on the lever 30 by means of a lever 34 pivoted as at 35 and shown as forked at its ends to embrace the weight 32, the lever 34 being provided with a suitable handle 36, which is accessible to the operator.

The tube 22 is connected at its other end by the link 96 to the rod of a piston 97 movable in the cylinder 261, which is connected by the pipe 27 with the reservoir or pressure tank 37. The tube 22 is provided with two sets of contact points or terminals as herein shown, one set marked 23—24 being located near one end of the tube, and a second set 25—26 being located near the center and on the underside of the same, so that the mercury passing from one end of the tube to the other makes contact with the set 25—26 for a purpose as will be described.

The weight 32 normally tends to turn the lever 30 so as to lower the end of the tube in which the contacts 23—24 are located. The contact points or terminals 23—24 are connected in circuit with the spark plugs 75 of the engine 1, (see Fig. 3) through the circuit controller consisting of a collector ring 18 and contact points 20 fast on a drum 100 mounted on a shaft 17 (see Fig. 1), and with which coöperates a contact spring 15 attached to the inner periphery of a gear 13. The contact points 25—26 of the movable circuit controller are connected as shown in Fig. 3 with the collector ring 19 and contact points 21 on the drum 100, and with which coöperates a contact spring 16. The gear 13 is fast on a shaft 14 supported in suitable bearings (not shown) and engages a gear 3 on the crank shaft 2 of the engine, the gear 3 in the present instance acting as the fly wheel for the said engine.

By reference to Figs. 2 and 3 it will be seen that the circuit controlling tube may be turned on its pivot by movement of the weight 32 on the lever 30, so as to cause the mercury 95 to flow from the left hand end of the tube 22 to the other end containing the contacts 23—24, and as the mercury passes over the contacts 25—26, the circuit for one of the sparking plugs 75 of one cylinder of the engine 1 is completed and the engine thereby started in operation. The segments 21 are made longer than the segments 20, so that the circuit closed by the mercury making contact with the points 25, 26 may ignite the charge in any one of the cylinders in which the gas is compressed. When the mercury reaches the opposite end of the tube and makes contact with the terminals 23—24, it completes the circuit of the spark plugs through the collector ring 18 and contacts 20 and brush or spring 15. When the circuit controller is in the condition last described, with the mercury at the right hand end of the tube (viewing Fig. 2), the piston 97 is in its lowered position and the pressure in the tank or vessel 37 is at its minimum predetermined point. As soon as the engine 1 is started, waste gases are exhausted through the pipe 11 into the chamber or vessel 37, the exhaust pipe 11 being provided with a suitable check valve 12, which is closed by the back pressure in the tank or reservoir 37. The engine 1 continues to run until the pressure in the reservoir 37 has reached a predetermined amount sufficient to overcome the weight 32, whereupon the said pressure acting on the underside of the piston 97 will turn the circuit controlling tube 22 on its pivot into the position shown in Fig. 2, in which case the mercury leaves the contacts 23, 24 and flows to the lower end of the tube, thereby interrupting the circuit of the spark plugs at the contact 23, 24 and thus stopping the engine 1. The engine 1 is again started automatically when the pressure in the tank 37 falls below a predetermined point and is such as to permit the weight 32 to again elevate the end of the tube 22 connected with it and thereby establish the circuit of the sparking plugs, as above described. It will thus be seen that the engine 1 is automatically governed in its operation by the pressure in the tank 37, being stopped when the said pressure reaches a predetermined point and being started again when the pressure falls below a predetermined point.

Provision is made for the operator to control the operation of the turbine 42 and thereby the motion of the vehicle by a single device, shown in the present instance as a plug valve 71 having three passages 72, 73, 74, which coöperate with suitable ports in the shell or casing 66 of the valve, one of the said ports being connected by a pipe 68 with the pressure tank 37, another port being connected by pipe 65 with the cylinder 64 for a purpose as will be described, another port being connected by the pipe 57 with the cylinder 55 for a purpose as will be described, and another port 67 being connected with the atmosphere.

The cylinder 55 may be designated the governor cylinder and contains within it a piston 54 (see Fig. 2), which is moved in one direction by the pressure of the gases admitted through the pipe 57 and in the opposite direction by a spring 56. The piston 54 is operatively connected with the valve 45 for the turbine engine and this may be effected as herein shown by providing the piston rod 50 with rack teeth 49, which engage a pinion 48 on a shaft 47 provided with a second pinion 46, which meshes with a toothed segment 70 attached to or forming part of the turbine valve 45.

The piston rod 50 may and preferably will be connected by a coupling 69 with a centrifugal governor 51, operatively connected by the gears 52, 53 (see Fig. 1) with the driven shaft or rear axle 90.

The coupling 61 is such as to permit rotation of the governor while effecting longitudinal motion of the piston rod 50. The spring 56 normally serves to keep the valve disk 45 in its closed position, represented in Fig. 7, and thereby prevent admission of the pressure from the tank 37 into the turbine 42.

When it is desired to start the turbine in operation, the operator may turn the valve 71 so as to connect the pressure tank 37 with the cylinder 55 through the pipe 68, ports the cylinder 55 through the pipe 68, ports 73, 74 and pipe 57. The pressure admitted into the latter in opposition to the spring 56, thereby through the rack 49, gear 48, shaft 47, gear 46 and rack 70, turning the disk 45 into substantially the position represented in Fig. 8, so as to uncover the ports 92 in the face plate 76 and admit more or less of the pressure from the tank 37 into the turbine engine, thereby starting the latter in rotation and effecting movement of the driven shaft 90. By controlling the amount of pressure admitted into the cylinder 55, the valve 45 may be controlled so as to regulate the amount of pressure admitted into the turbine engine, thereby controlling the speed of the vehicle.

When the shaft is in operation, the governor 51 is driven from the shaft 90 by the gears 53, 52, and as the speed of the vehicle increases the governor automatically moves the piston rod 50 so as to exert an increasing tendency to close the valve 45. It will thus be seen that with a given pressure in the cylinder 55, the speed of the turbine 42 tends to increase until it has reached a speed such that the force exerted by the governor 51, by the gas pressure in the cylinder 55 and by the spring 56 are balanced, and any change in the speed of the turbine 42 unbalances the system, so that within the capacity of the engine and turbine the speed of the turbine bears a direct relation to the gas pressure in cylinder 55, and by regulating the gas pressure in the cylinder 55 by means of the valve 71, the speed of the vehicle is under absolute control of the operator by means of a single device or valve.

The cylinder 64 may be utilized for controlling the application of a brake, which may be made as herein shown and consists of a band 59 see Fig. 1, encircling the pulley 60 attached to the driven shaft or axle 90, the band 59 being connected to the piston rod of a piston 63 located in the cylinder 64 and actuated in one direction by the gas pressure admitted through the pipe 65, and in the opposite direction by the spring 62 encircling the rod of the piston 63 between the said piston and a fixed abutment or arm 61, the piston 63 being moved by the air pressure so as to release the brake which is set by the action of the spring 62. Provision is also made for utilizing the engine 1 as a brake under certain conditions as will be described. For this purpose the engine 1 is provided with a main gas supply chamber 10 with which is connected a valve casing 4, containing as represented in Fig. 4, a disk valve 6, mounted upon a stem 5 and having in it a port or opening 110 see Fig. 5, which is adapted in the rotation of the disk 6, to register with a gas supply pipe 7 and also with an opening 112 in the outside disk 8 of the valve casing, the opening 112 being suitably shaped to give a gradually increasing opening for the admission of air into the chamber 10, so that when the vehicle is being driven by the turbine 42, the engine 1 may be utilized as an air brake, its shaft 2 being driven from the shaft 90 through the gears 41, 39, shaft 102, clutch members 103—104, gears 38, and 3, under which conditions the port or opening 110 in the valve 6 registers with the opening 112 in the valve casing. By means of the clutch members 104, 103, the engine 1 may be utilized for producing a reverse motion to the driven shaft 90, and the clutch or member 104 may be operated in any suitable or usual manner as by the lever 105, the shaft 90 being in such case coupled with the engine shaft 2 through the gears 3, and 38, shaft 40, clutches 104, 103, shaft 102 and gears 39, and 41. Under normal conditions the clutch member 104 is disconnected from the member 103, and the vehicle is driven by the turbine engine. When the engine 1 is utilized as a brake, the valve 6 occupies substantially the position shown in Figs. 4 and 5, the gas supply pipe 7 is closed and the pipe 10 is connected with the atmosphere through the ports 110—112, and by turning the valve 6 so as to uncover more or less of the port 110, the amount of air drawn into the cylinders of the engine 1 may be varied from a small to a substantially large amount. In Fig. 6, the valve 6 is represented as closing both the pipe 7 and the air port 112. In Fig. 3 the contact 23 is represented as connected by the wire 113 with the collector ring 18, and the contact 24 is connected by wire 114 with one pole of the battery 115, the other pole of which is joined by wire 116 to one terminal of the sparking plugs 75, the other terminals of which are connected to the contact points 20, or 21 and thence by the brushes 15 or 16 with the collector rings 18, or 19, the collector ring 19 being connected to the contact point 26 by wire 117.

It will be understood that Fig. 3 is utilized merely to show the manner of automatically cutting out the electrical equipment for the gasolene engine through the movable circuit controller 22.

From the above description it will be seen that the exhaust gas in the internal combustion engine 1 is stored under pressure in the reservoir or tank 37 and is utilized for propelling the vehicle through the turbine engine 42, and it will further be seen that the speed of the motor vehicle is under absolute control of the operator, who is required only to manipulate a main or throttle valve such as 71, to regulate the speed of the turbine and of the vehicle at his will. It will also be seen that when the vehicle is being run by the compressed gases as the motive fluid, the engine 1 may be cut out until such time as the pressure in the tank 37 falls below a predetermined point, whereupon the engine may be automatically or manually brought into operation to again restore the gas pressure to the desired amount.

In the present instance I have shown the exhaust gases as utilized for propelling an automobile, but I do not desire to limit my invention in this respect, as the invention is applicable for propelling railroad locomotives, marine and stationary engines, and systems of any kind now using compressed air. It is applicable in all cases when explosive fluids are used as the motive power for the combustion engine, such as gasolene and producer or natural gases.

By the term "turbine engine" as used herein, I desire it to be understood as including any gas operated motor.

Claims.

1. In combination, a motor vehicle provided with a shaft, a turbine engine connected with said shaft to drive the same and propel said vehicle, a pressure tank or vessel in communication with said turbine, means to control the supply of fluid under pressure from said tank or vessel to said turbine, an internal combustion engine connected with said pressure tank to discharge therein its exhaust gases, and having its shaft mechanically disconnected from the turbine driven shaft while the latter is being driven by said turbine and a circuit controller governing the operation of said internal combustion engine and responsive to variations in pressure in said tank or vessel, substantially as described.

2. In combination, a motor vehicle provided with a shaft, a turbine engine connected with said shaft to drive the same and propel said vehicle, a pressure tank or vessel in communication with said turbine, means to control the supply of fluid under pressure from said tank or vessel to said turbine, an internal combustion engine connected with said pressure tank to discharge therein its exhaust gases, a brake mechanism for said shaft actuated by pressure from said tank or vessel, and a circuit controller governing the operation of said internal combustion engine and responsive to variations in pressure in said tank or vessel, substantially as described.

3. In combination, a motor vehicle provided with a shaft, a turbine engine connected with said shaft to drive the same and propel said vehicle, a pressure tank or vessel in communication with said turbine, means to control the supply of fluid under pressure from said tank or vessel to said turbine, an internal combustion engine connected with said pressure tank to discharge therein its exhaust gases, a governor operatively connected with said shaft and with said pressure tank, and controlling the admission of fluid under pressure into said turbine, and a circuit controller for said internal combustion engine responsive to variations in pressure in said tank, substantially as described.

4. In combination, a motor vehicle provided with a shaft, a turbine engine connected with said shaft to drive the same and propel said vehicle, a pressure tank or vessel in communication with said turbine, means to control the supply of fluid under pressure from said tank or vessel to said turbine, and an internal combustion engine connected with said pressure tank to discharge therein its exhaust gases, and having its shaft mechanically disconnected from the turbine driven shaft while the latter is being driven by said turbine substantially as described.

5. In combination, a shaft, a turbine connected with the same to effect rotation thereof, a tank or vessel containing gases of combustion under pressure and in communication with said turbine, means to control the passage of fluid from said tank or vessel into said turbine, and an internal combustion engine having its exhaust connected with said tank, and having its shaft mechanically disconnected from the turbine driven shaft while the latter is being driven by said turbine substantially as described.

6. In combination, an internal combustion engine, a tank or vessel connected with the said engine for the discharge of the exhaust gases into said vessel and for the accumulation of said gases therein, means to control the passage of the gases out of the said vessel, means mechanically disconnected from the combustion engine and operatively connected with said pressure tank and means responsive to variations in pressure of the gases in said tank or vessel for controlling said engine, substantially as described.

7. In combination, an internal combustion engine, a pressure tank or vessel connected with said engine for the reception of the exhaust gases therefrom, a turbine in communication with said tank or vessel, means for controlling the admission of fluid under pressure from said tank or vessel into said turbine, a shaft driven by said turbine, and normally inactive means for connecting said engine with said shaft to rotate it in a reverse direction to that in which it is rotated by said turbine, substantially as described.

8. In combination, an internal combustion engine, a pressure tank or vessel connected with said engine for the reception of the exhaust gases therefrom, a turbine in communication with said tank or vessel, means for controlling the admission of fluid under pressure from said tank or vessel into said turbine, a shaft driven by said turbine, normally inactive means for connecting said engine with said shaft to rotate it in a reverse direction to that in which it is rotated by said turbine, and means for converting said engine into a fluid brake, substantially as described.

9. In combination, an internal combustion engine, a pressure tank or vessel connected with said engine for the reception of the exhaust gases therefrom, a turbine engine connected with said tank, means for controlling admission of fluid under pressure from said tank or vessel into said turbine, a shaft driven by said turbine, intermediate shafts and gearing connecting said internal combustion engine with the shaft driven by said turbine, to effect rotation of said driven shaft in a direction opposite to that in which it is driven by said turbine and a clutch to couple and uncouple said intermediate shafts, substantially as described.

In testimony whereof, I have signed my name to this specification in the presence of two subscribing witnesses.

SAMUEL T. WILLIS.

Witnesses:
JAS. H. CHURCHILL,
J. MURPHY.